(12) United States Patent
Wang (10) Patent No.: US 9,602,407 B2
(45) Date of Patent: Mar. 21, 2017

(54) TRIE STAGE BALANCING FOR NETWORK ADDRESS LOOKUP

(71) Applicant: Futurewei Technologies, Inc., Plano, TX (US)

(72) Inventor: Zixiong Wang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 437 days.

(21) Appl. No.: 14/108,581

(22) Filed: Dec. 17, 2013

(65) Prior Publication Data

US 2015/0172191 A1 Jun. 18, 2015

(51) Int. Cl.
*H04L 12/44* (2006.01)
*H04L 12/745* (2013.01)
*H04L 12/743* (2013.01)
*H04L 12/56* (2006.01)

(52) U.S. Cl.
CPC .......... *H04L 45/748* (2013.01); *H04L 45/741* (2013.01); *H04L 45/7457* (2013.01)

(58) Field of Classification Search
CPC . H04L 45/748; H04L 45/741; H04L 45/7457; H04L 45/7453; H04L 45/745; H04L 12/44
See application file for complete search history.

(56) References Cited

U.S. PATENT DOCUMENTS

| | | | |
|---|---|---|---|
| 6,532,516 | B1 | 3/2003 | Krishna et al. |
| 6,980,552 | B1 | 12/2005 | Belz et al. |
| 7,249,149 | B1 | 7/2007 | Eatherton et al. |
| 7,440,304 | B1 | 10/2008 | Raj |
| 7,539,153 | B1 * | 5/2009 | Liang ............... H04L 45/00 370/255 |
| 7,624,226 | B1 | 11/2009 | Venkatachary et al. |
| 7,707,217 | B2 | 4/2010 | Allwright et al. |
| 7,739,445 | B1 | 6/2010 | Venkatachary |
| 7,805,393 | B1 | 9/2010 | Venkatachary et al. |

(Continued)

FOREIGN PATENT DOCUMENTS

| | | |
|---|---|---|
| CN | 101631086 A | 1/2010 |
| CN | 101741737 A | 6/2010 |
| EP | 2512073 A1 | 10/2012 |

OTHER PUBLICATIONS

"Internet Protocol, Darpa Internet Program, Protocol Specification," RFC 791, Sep. 1981, 50 pages.

(Continued)

*Primary Examiner* — Chandrahas Patel
*Assistant Examiner* — Lan Huong Truong
(74) *Attorney, Agent, or Firm* — Conley Rose, P.C.

(57) ABSTRACT

A trie comprising a plurality of subtries may be balanced by storing, in a first memory stage, a first root that identifies a first subtrie of a trie and a second root that identifies a second subtrie, which is a direct or indirect child of the first subtrie. A plurality of network address prefixes representing vertexes in the plurality of subtries may be stored in at least one additional memory stage. As the first subtrie is located on a top subtrie level which may contain relatively fewer network address prefixes, promoting the second subtrie to the top subtrie level may help improve memory utilization. Further, looking up any received network address may have less memory access latency.

16 Claims, 8 Drawing Sheets

(56) References Cited

U.S. PATENT DOCUMENTS

| | | |
|---|---|---|
| 7,986,696 B1 | 7/2011 | Miliavisky et al. |
| 8,166,536 B1 | 4/2012 | Ammundi et al. |
| 8,566,276 B1 | 10/2013 | An |
| 8,625,604 B2 * | 1/2014 | Bando ................. H04L 45/7457 370/395.31 |
| 8,868,790 B2 | 10/2014 | Lovett et al. |
| 8,880,507 B2 * | 11/2014 | Kotha ............... G06F 17/30625 707/715 |
| 8,880,556 B1 | 11/2014 | An |
| 9,049,157 B1 | 6/2015 | Miliavsky et al. |
| 2002/0129086 A1 | 9/2002 | Garcia-Luna-Aceves et al. |
| 2003/0065878 A1 | 4/2003 | Krishna et al. |
| 2004/0008634 A1 | 1/2004 | Rangarajan et al. |
| 2004/0100950 A1 | 5/2004 | Basu et al. |
| 2004/0111440 A1 | 6/2004 | Richardson et al. |
| 2004/0193619 A1 * | 9/2004 | Venkatachary ......... H04L 45/00 |
| 2004/0249803 A1 * | 12/2004 | Vankatachary ......... H04L 45/00 |
| 2005/0083937 A1 | 4/2005 | Lim |
| 2005/0237939 A1 | 10/2005 | Corl, Jr. et al. |
| 2006/0155915 A1 | 7/2006 | Pereira |
| 2006/0167843 A1 | 7/2006 | Allwright et al. |
| 2006/0253606 A1 | 11/2006 | Okuno |
| 2006/0253816 A1 | 11/2006 | Gould et al. |
| 2007/0121632 A1 * | 5/2007 | Zabarski ................. H04L 45/00 370/392 |
| 2007/0136331 A1 | 6/2007 | Hasan et al. |
| 2008/0046423 A1 | 2/2008 | Khan Alicherry et al. |
| 2008/0225874 A1 | 9/2008 | Lee |
| 2009/0150603 A1 | 6/2009 | Sahni et al. |
| 2010/0293327 A1 | 11/2010 | Lin et al. |
| 2010/0316051 A1 | 12/2010 | Song et al. |
| 2011/0038375 A1 | 2/2011 | Liu et al. |
| 2011/0128960 A1 | 6/2011 | Bando et al. |
| 2011/0307656 A1 | 12/2011 | Hamdi et al. |
| 2012/0072380 A1 | 3/2012 | Liu et al. |
| 2012/0137060 A1 | 5/2012 | Akerib et al. |
| 2013/0031077 A1 | 1/2013 | Liu et al. |
| 2013/0034096 A1 | 2/2013 | Hu et al. |
| 2013/0117766 A1 | 5/2013 | Bax et al. |
| 2013/0294450 A1 | 11/2013 | Wang et al. |
| 2014/0003436 A1 | 1/2014 | Wang |
| 2015/0172191 A1 | 6/2015 | Wang |

OTHER PUBLICATIONS

Deering, S., et al., "Internet Protocol, Version 6 (IPv6) Specification," RFC 1883, Dec. 1995, 37 pages.

Foreign Communication From a Counterpart Application, PCT Application No. PCT/CN2014/093920, English Translation of International Search Report dated Mar. 25, 2015, 7 pages.

Foreign Communication From a Counterpart Application, PCT Application No. PCT/CN2014/093920, English Translation of Written Opinion dated Mar. 25, 2015, 5 pages.

Vamanan, B., et al., "TreeCAM: Decoupling Updates and Lookups in Packet Classification," ACM CoNEXT, Dec. 6-9, 2011, 12 pages.

Eatherton, W., et al., "Tree Bitmap: Hardware/Software IP Lookups with Incremental Updates," ACM SIGCOMM Computer Communication Review, vol. 34, Issue 2, Apr. 2004, pp. 97-122.

Foreign Communication From a Counterpart Application, PCT Application No. PCT/CN2013/078204, English Translation of International Search Report dated Oct. 17, 2013, 6 pages.

Foreign Communication From a Counterpart Application, PCT Application No. PCT/CN2013/078204, English Translation of Written Opinion dated Oct. 17, 2013, 4 pages.

Office Action dated Sep. 17, 2015, 22 pages, U.S. Appl. No. 13/920,306, filed Jun. 18, 2013.

Baboescu, F., et al., "A Tree Based Router Search Engine Architecture With Single Port Memories", 2005 IEEE, ISCA '05, Proceedings, 32nd International Symposium on Digital Object Identifier, 11 pgs.

* cited by examiner

TRIE STAGE BALANCING FOR NETWORK ADDRESS LOOKUP

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Packet switching is employed in communication systems, wherein packets may be transmitted from one router to another across networks or sub-networks. In order to forward traffic, a router may use a routing table to look up the address and egress port of a next hop. Such a routing table may be known as a forwarding information base (FIB), wherein a destination address of a packet may be a key in an FIB.

Upon receiving a packet, the router may perform a network address lookup to find the longest prefix match between the destination address of the packet and a network address prefix and subsequently determine the corresponding outgoing interface. Thus, storing and accessing such information efficiently and intelligently may improve the lookup process, and is thereby a challenging problem in today's networking paradigm.

Trie lookup is a widely used network address lookup technique implemented in a router. A trie may be a tree data structure in which the position of a node in the tree represents a corresponding path key. A node in a trie may represent a longest prefix match (LPM) up to the position of the node, which may be useful in representing network address prefixes in an FIB. The trie lookup technique may be further improved with a multi-bit trie that examines multiple bits for a network address lookup. Multi-bit trie based algorithms may be achieved through pipelined trie levels or stages; however, the number of network address prefixes located on different trie stages may sometimes be heavily unbalanced, resulting in low memory utilization for stages which have less prefixes. Consequently, there may be a need to balance trie stages and corresponding memories in order to improve efficiency in network address lookup operations.

SUMMARY

In an example embodiment, a trie comprising a plurality of subtries may be balanced by storing, in a first memory stage, a first root that identifies a first subtrie of a trie and a second root that identifies a second subtrie, which is a direct or indirect child of the first subtrie. Further, a plurality of network address prefixes representing vertexes in the plurality of subtries may be stored in at least one additional memory stage. As the first subtrie is located on a top subtrie level which may contain relatively fewer network address prefixes, promoting the second subtrie to the top subtrie level may help improve memory utilization.

Disclosed example embodiments may help reduce memory access latency when looking up a longest prefix match (LPM) for an incoming network address. After receiving a packet comprising a network address, a network router may first look up the first memory stage to identify a matched root, among the first and second roots stored therein, as having the most bits and matching with a number of most significant bits (MSBs) in the network address. If bits of the second root identifying the second subtrie match with the MSBs, the second root may be identified as the matched root. Accordingly, the LPM residing in the second subtrie may be looked up quickly without the need to traverse through other subtries, thus speeding up the lookup process.

Disclosed example embodiments may improve network address lookup by first looking up a ternary content-addressable memory (TCAM) to identify a matched root as having full bits matching with a number of MSBs in a received network address. The matched root may be one of a plurality of subtrie roots stored in the TCAM for a trie, and a vertex identified by the matched root may be a direct or indirect child of a root of the trie. Then, a non-TCAM memory may be looked up to identify an LPM as having a longest match with a second number of bits immediately trailing the MSBs in the network address. The LPM may be one of a plurality of network address prefixes stored in the non-TCAM memory, and may be a direct or indirect child of the matched root.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A network router may have a few network address prefixes stored in a forwarding information base (FIB). These prefixes may be represented by specific nodes on a trie. During operation, suppose a packet arrives at the router with a network address. Then, a lookup process is initiated, wherein a respective bit in the address is examined and a corresponding traversal through the trie is performed. During the traversal, whenever a node corresponding to a prefix in the FIB is found, the lookup process determines that the address matches the prefix. This process continues until the longest prefix that is stored in the FIB corresponding to the address is found. This match is known as the longest prefix match (LPM). Subsequent forwarding operations on the packet are performed based on the LPM.

Figure 1:
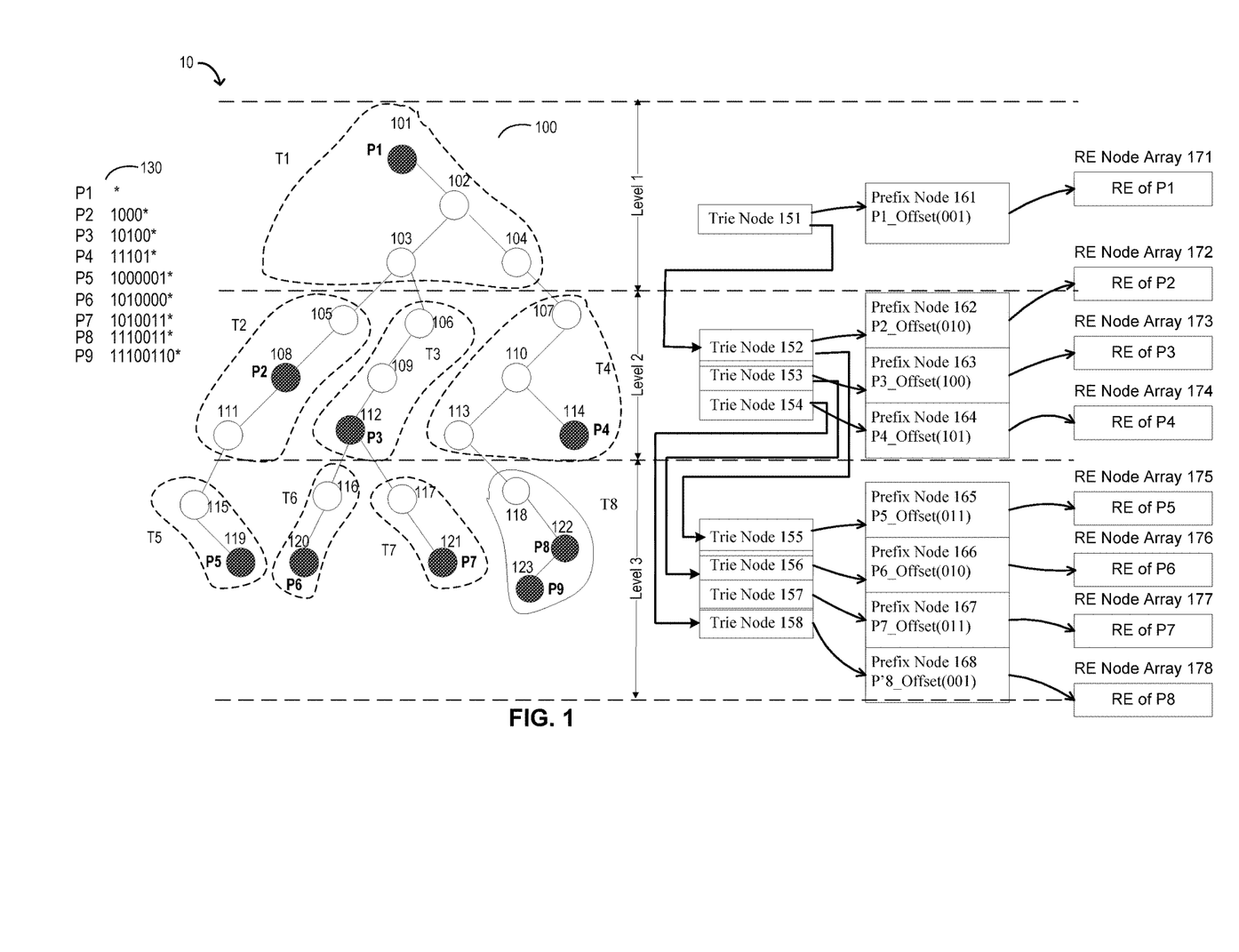
FIG. 1 illustrates an example embodiment of a trie-based lookup algorithm.

FIG. 1 illustrates an example traditional trie-based lookup implementation 10. In the implementation 10, Internet Protocol (IP) addresses with a length of 10 bits are assumed as an example, although it should be understood that the same concept may be applied to any other length or type of network addresses, such as 32-bit-long IP version 4 (IPv4), 128-bit-long IPv6 addresses, or 64-bit-long media access layer (MAC) addresses. As shown in FIG. 1, a prefix table 130 contains a list of network address prefixes, denoted as P1-P9, which may be stored in a FIB of a router. The prefixes listed in the prefix table 130 may be determined beforehand by a higher level system and represents the exemplary FIB. A trie 100 includes a plurality of nodes or vertexes 101-123 and represents prefixes shown in the prefix table 130. In trie 100, a left edge may indicate a binary 0 and a right edge may indicate a binary 1. For example, a right edge from root node 101 to node 102 corresponds to a 1, and a left edge from the node 102 to node 103 corresponds to a 0. All other edges in trie 100 follow the same pattern. For example, traversing from root node 101 to leaf node 114 may go through one right traversal to node 102, one right traversal to node 104, one right traversal to node 107, one left traversal to node 110, and one right traversal to node 114. As a result, node 114 represents the prefix P4 of 11101. Further, the nodes 101-121, as shown in FIG. 1, are numbered based on a breadth-first order, in which a parent node may precede a child node, and a left child node may precede a right child node.

Note that an asterisk symbol ("*") following a prefix denotes any combination of bits thereafter, and is not part of the prefix itself. For example, P1 in the prefix table 130 represents "*" indicating that P1 can be a prefix to any network address. Because root node 101 does not need any traversal in trie 100, node 101 represents P1. For another example, P4 represents "11101*" indicating that P4 can be a prefix to any network address beginning with "11101." In other words, P4 corresponds to network address prefix "11101" and is represented by node 114. Also, note that the trie 100 is constructed to represent prefixes stored in a network router. Hence, some of the nodes in trie 100 may not correspond to any prefix. These non-prefix or intermediate vertexes are denoted using white circles in FIG. 1, while the prefix nodes are denoted using black circles in FIG. 1.

In a lookup process, multiple bits of an incoming network address may be examined at a time. The number of bits examined each time may be referred to as a stride size. As shown in FIG. 1, the trie 100 representing the prefixes P1-P9 may be divided into subtries, each representing a tree traversal of stride size. Thus, the trie 100 may be referred as a multi-bit trie. In implementation 10, we assume a stride size of 3. Trie 100 is divided into eight subtries, denoted as T1-T8, based on the stride size. For a stride size of 3, all prefixes with fewer than three bits (prefix P1) may be represented by subtrie T1. Subtrie T2 is a child subtrie of subtrie T1, indicating that the first two bits (i.e., bits prior to the stride size) of all prefixes represented by subtrie T2 represents a path traversal through subtrie T1. For example, the first two bits of P2 ("1000") corresponds to a path from node 101, via node 102, to node 103. Similarly, subtries T3 and T4 are child subtries of subtrie T1, subtrie T5 is a child subtrie of subtrie T2, subtries T6 and T7 are child subtries of subtrie T3, and subtrie T8 is a child subtrie of subtrie T4. Note that the child subtrie relationship is transitive. For example, because subtrie T5 is a child subtrie of subtrie T2, and subtrie T2 is a child subtrie of subtrie T1, subtrie T5 is also a child subtrie of subtrie T1. Additionally, the subtries may be divided among different levels, which may also be referred to as trie stages. For example, a first level may comprise subtrie T1, while a second level may comprise subtries T2, T3, and T4. A third level may comprise subtries T5, T6, T7, and T8.

A respective subtrie may be characterized by one or more prefixes associated with the subtrie, and one or more child subtries. Consequently, the subtrie may be represented by using the following data structures: trie nodes, prefix nodes, and routing element (RE) arrays. In FIG. 1, trie nodes 151-158 represent subtries T1-T8, respectively. There may be one trie node per subtrie in order to identify child subtries of the subtrie. A trie node 151 may maintain a bitmap or other information corresponding to its child subtrie nodes. Prefix nodes 161-168 represent subtries T1 -T8, respectively, and are pointed to by trie nodes 151-158, respectively. There may be one prefix node per subtrie to identify prefixes represented by the subtrie. A prefix node 161 may maintain a bitmap corresponding to other information to a respective prefix represented by the subtrie. RE arrays 171-178 represent subtries T1-T8, respectively, and are pointed to by prefix nodes 161-168, respectively. There may be one RE array per subtrie. A prefix node 161 may include a pointer to RE array 171, wherein one or more elements in RE array 171 may contain forwarding information for prefix(es) identified by prefix node 161 (e.g., P1). Forwarding information for a respective prefix may include a network address of a next hop network router and a corresponding outgoing interface.

A prefix identified by a prefix node may be represented using offset encoding. For example, each of the subtries in FIG. 1 may have up to 7 nodes due to a stride size of 3, even though some of the nodes are not shown in FIG. 1. These nodes may be numbered according to their breadth-first order, and the resulting prefix encoding is called offset encoding. For example, P1 is the first node of subtrie T1 and represented by a bitstring "001" corresponding to an offset encoding value of 1. For another example, P3 is the fourth node of subtrie T3 and represented by a bitstring "100" corresponding to an offset encoding value of 4.

During operation, a network router may receive a packet with a 10-bit IP address "1010011000." To look up this IP address, trie 100 is traversed or looked up with a stride size of 3 (thus a total of 4 strides). Specifically, the root subtrie T1 is checked first against the first stride "101", and P1 is recorded as a current longest prefix match (LPM) within the root subtrie T1. Next, the first stride "101" may be used to select the child subtrie T3, and P3 in T3 may be found to be the current LPM by checking against the second stride "001". Then, the second stride "001" may be used to select the child subtrie T7, and P7 may be found to be the current LPM by checking against the third stride "100". Since T7 does not have any child subtrie as shown in FIG. 1, and the fourth stride "0" is the last stride, P7 in T7 may be determined by the implementation 10 to be the ultimate LPM. Once the ultimate LPM is found, RE array 177 may be accessed using the corresponding pointer in prefix node 167, wherein forwarding information for the match may be retrieved.

In practice, the multi-bit tri-based lookup implementation 10 may require a significant memory space to store the trie nodes and high memory bandwidth to access trie nodes and prefix nodes on per trie stride basis. Additionally, prefix distribution in the FIG. 1 trie may be skewed, wherein the first, second, and third subtrie levels have one, three, and five prefixes, respectively. An unbalanced prefix distribution is typical in conventional FIBs as well, wherein the first few trie stages may have a few prefixes while one or two later stages have a larger number of prefixes. The subtrie levels may be mapped to corresponding memory stages, wherein each memory stage stores the same number of prefixes as the corresponding subtrie levels. As high density memories are utilized for trie stages, this unbalanced prefix distribution leads to memory waste, particularly among the first few stages. For data center and cloud applications, requirements such as high throughput (e.g., tera-bits per second) and low latency may be difficult to meet using the existing algorithms.

Disclosed herein are example embodiments for balancing trie stages in order to improve the efficiency of network address lookup. As a trie comprising a plurality of subtrie levels or stages may contain uneven numbers of network address prefixes on different subtrie levels, example embodiments may balance the levels by promoting certain prefixes from later and more populated levels to earlier and less populated levels. For instance, in a memory system comprising a plurality of memory stages or blocks, a first memory stage, which may be a ternary content-addressable memory (TCAM) or a non-TCAM, may store multiple roots that identify multiple subtries on different levels (e.g., a first root may identify a first subtrie, and a second root may identify a second subtrie that is a direct or indirect child of the first subtrie). Additional memory stages may be non-TCAM and may store information representing subtries of the trie.

In use, a network address may be received by a network router and an address lookup may be conducted thereafter. In the search pipeline, the first memory stage may be looked up first to identify a matched root, among multiple bits stored therein, that has the most bits and fully matches with a number of most significant bits (MSBs) in the network address. For instance, if bits of a second root identifying a child subtrie matches with the MSBs, the second root may be identified as the matched root; otherwise, a first root identifying the trie itself may be identified as the matched root. Additionally, to further balance an uneven trie, interstage trie promotion may be used to balance the subtrie levels, wherein one or more subtries may be shifted to an earlier stage via rich trie nodes. Balancing subtrie levels using example embodiments disclosed herein may result in more efficient memory utilization, along with reduction in bandwidth requirement and memory access latency.

Figure 2A:
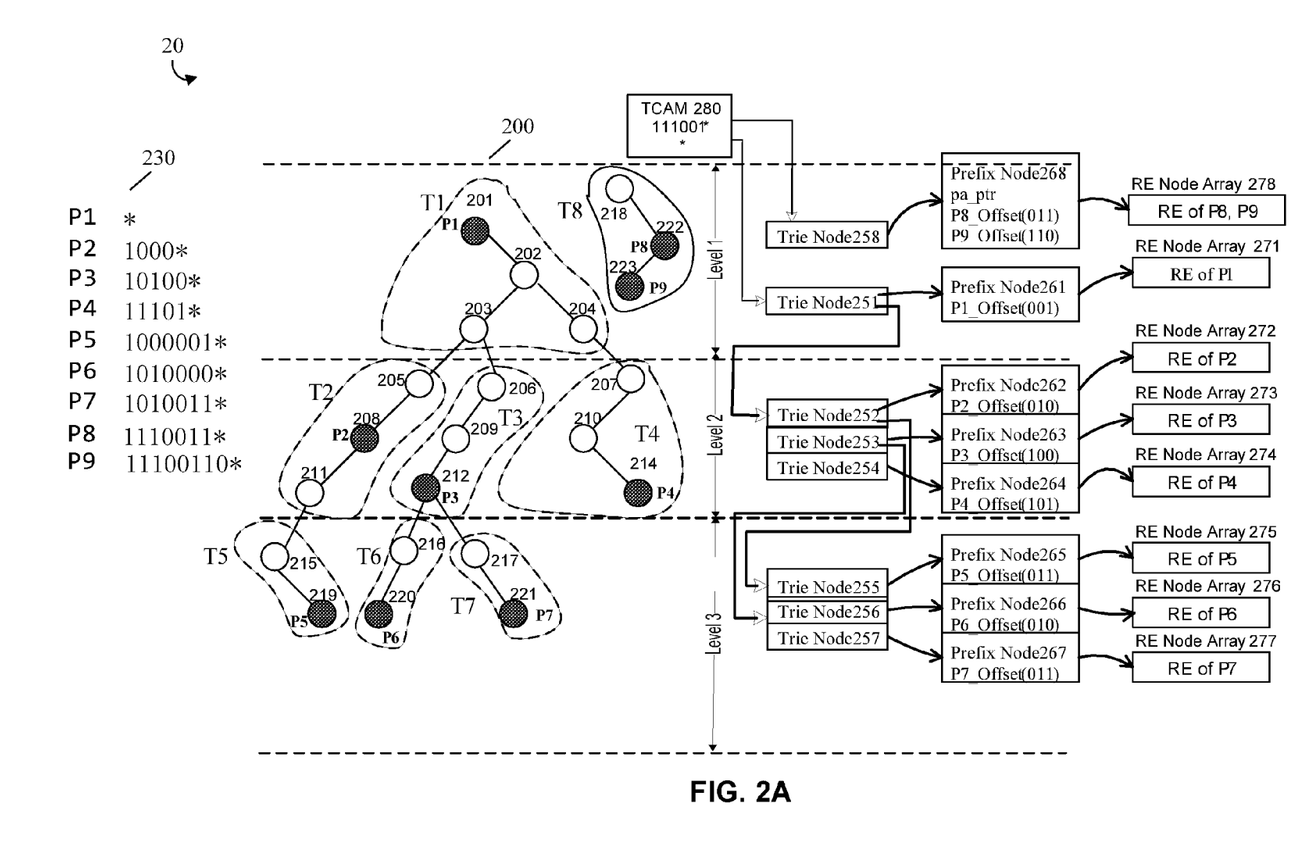
FIG. 2A illustrates an example embodiment of a ternary content-addressable memory (TCAM) balanced trie-based lookup algorithm.

FIG. 2A illustrates an example embodiment of a TCAM balanced trie-based lookup implementation 20 in a network router. The implementation 20 may use a trie 200 which comprises a plurality of nodes 201-223, wherein corresponding prefixes are shown in a prefix table 230. Trie nodes 251-258 represent subtries T1-T8, respectively, and point to prefix nodes 261-268, respectively. Prefix nodes 261-268 also represent subtries T1-T8, respectively, and point to RE arrays 271-278, respectively. Note that the same notation may be used in different figures herein to refer to different elements (e.g., T1 refers to subtrie 101 in FIG. 1, but refers to subtrie 201 in FIG. 2A). The disclosed lookup implementation 20 may employ a TCAM 280 for prefix promotion and trie stage balancing. TCAM is a special type of content-addressable memory (CAM) that allows a ternary matching state of "X" or "do not care" for one or more bits in a stored dataword, such as a network address. In comparison, a non-TCAM memory, such as a binary CAM may use data search words consisting of 1s and 0s.

As described above, the trie 100 in FIG. 1 contains uneven prefixes in different subtrie levels of the trie. In practice, it may be beneficial to produce a more balanced trie structure which increases memory utilization efficiency. Herein, the subtrie T8 may be promoted from a third level as shown in implementation 10 to a first level as shown in implementation 20. The top vertex of subtrie T8 in implementation 10 is node 118. Traversing from node 101 to leaf node 118 may go through one right traversal to node 102, one right traversal to node 104, one right traversal to node 107, one left traversal to node 110, one left traversal to node 113, and one right traversal to node 118. As a result, node 118 represents root "111001*". Node 118 in FIG. 1 may correspond to node 218 in FIG. 2A, wherein the associated subtrie T8 is now positioned at the first level of the trie 200. Accordingly, subtrie T8s corresponding nodes 218, 222, and 223, trie node 258, prefix node 268, and RE array 278 may also be positioned on the first subtrie level.

In an example embodiment, the TCAM 280 may be configured to store two roots, a first root of "*" and a second root of "111001*", that identifies two subtries. The first root "*" may be a wildcard entry which may be a prefix to any network address, whereas the second root "111001*", sometimes referred to as a path key, may indicate a traversal path in the trie 200 from the root node 201 to a top vertex 218 of the subtrie T8. Note that the TCAM 280 is considered a first memory stage, while the levels 1-3 shown in FIG. 2 may be considered second, third, and fourth memory stages, respectively.

In a lookup process, when a network address is received by a network router, the implementation 20 may initially look up the two roots stored in TCAM 280 to determine which root has a longest match with the network address. If the network address does not match prefix "111001*", then the address matches the wildcard entry "*", which may comprise a pointer to trie node 251 and point to subtrie T1. The implementation 20 may proceed to check subtrie T1 and continue traversal through the rest of the trie.

Otherwise, if the network address matches prefix "111001*", then the implementation 20 may access trie node 258 and prefix node 268. The prefix "111001*" entry may comprise a pointer to trie node 258 and prefix node 268, which both correspond to subtrie T8. RE array 278 may subsequently be accessed using the corresponding pointer in prefix node 268, and forwarding information for the match may be retrieved from the array. For example, implementation 20 may be employed to look up the IP address "1110011000". The entries in TCAM 280 may be searched initially, and a LPM match may be found for subtrie T8s root "111001*". Trie node 258 and then prefix node 268 may be read, and a LPM match may be found for prefix P9. Finally, RE array 278 may be read for forwarding information.

It should be understood that even though, in implementation 20, the subtrie T8 is promoted from the third subtrie to the first subtrie level, the subtrie T8 may still be considered a direct child of the subtrie T4 and an indirect child of the subtrie T1. That is, T4 is a direct parent subtrie of T8, and T1 is an indirect parent subtrie of T8. To accommodate the promotion of the subtrie T8, a parent pointer denoted as "pa_ptr" may be added to prefix node 268. The pointer "pa_ptr" may point to RE array 274 corresponding to P4 located in T4, since P4 is the parent prefix for subtrie T8. For example, implementation 20 may be employed to look up the IP address "1110010000". A LPM match may be found for subtrie T8s root "111001*" after checking TCAM 280. Trie node 258 may be read, and a mismatch may be found. As a result, the pointer "pa_ptr" may be used to read RE array 274 for prefix P4, since P4 is the best match found.

The encoding of subtries may use various schemes. For example, a relatively dense subtrie may be encoded as a bit map, while a relatively sparse subtrie may be encoded as a rich prefix node. More details on subtrie encoding, rich trie node, prefix node, etc. can be found in U.S. patent application Ser. No. 13/464,840 filed May 4, 2012 by Z. Wang et al. and entitled "Optimized Trie-Based Address Lookup," and in U.S. patent application Ser. No. 13/920,306 filed Jun. 18, 2013 by Z. Wang et al. and entitled "Internet Protocol and Ethernet Lookup Via a Unified Hashed Trie," both of which are incorporated herein by reference.

Figure 2B:
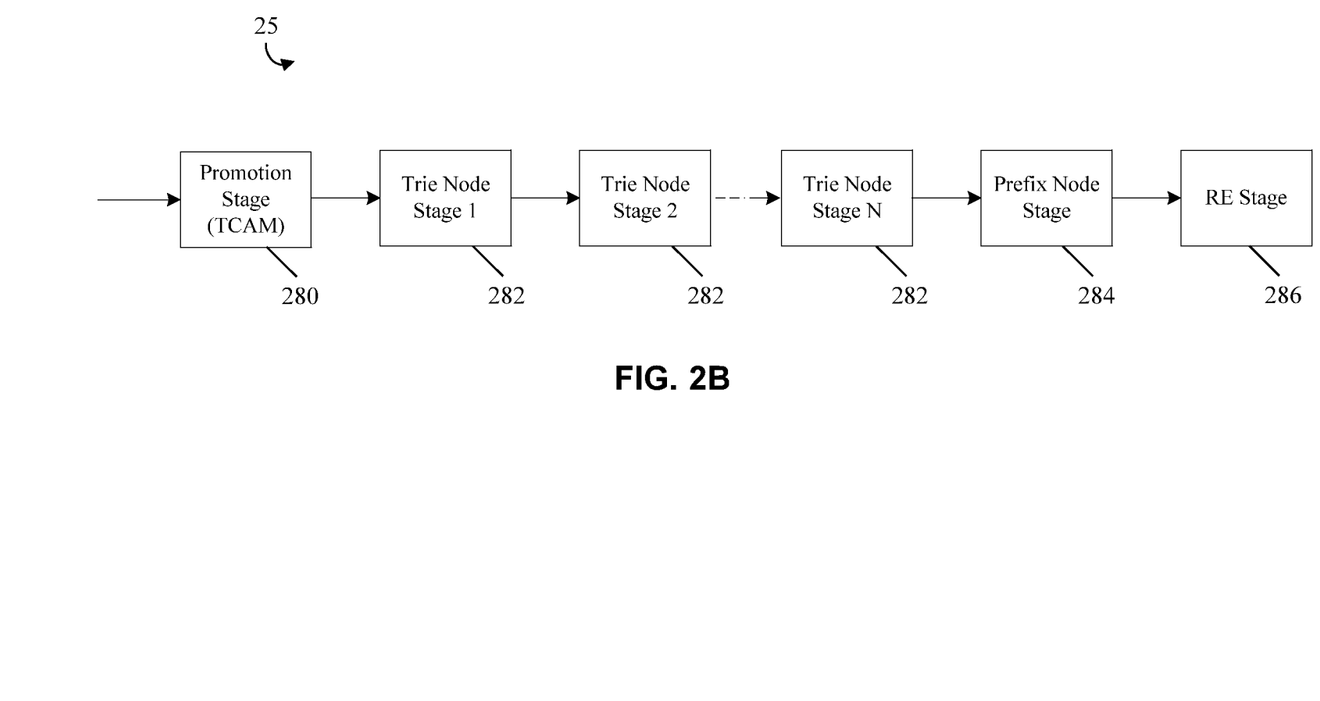
FIG. 2B illustrates an example embodiment of a search pipeline implemented in a memory system.

FIG. 2B illustrates an example embodiment of a search pipeline 25, which may be implemented in a memory system. The pipeline 25 may use a series of memory stages that are accessed during a trie-based network address lookup. These memory stages may comprise a promotion stage 280, a plurality of trie node stages 282 (numbered from 1 to N which is an integer), a prefix node stage 284, and an RE stage 286. In other words, a first memory stage may be used to implement the promotion stage 280, a second memory stage may be used to implement the trie node stage 1, a third memory stage may be used to implement the trie node stage 2, and so forth. It should be noted that a trie node stage may be implemented using multiple memory stages or using one memory stage. Further, each additional memory stage may be used to implement the prefix node stage 284 and the RE stage 286, respectively. Corresponding to the implementation 20, the first memory stage may use a TCAM, while other memory stages may use non-TCAM memories such as static random access memory (SRAM) and/or embedded dynamic random access memory (eDRAM).

In the pipeline 25, TCAM root entries identifying subtries T1 and T8 in FIG. 2A, may be stored in the promotion stage 280. Next, the trie node stages 282 may follow, wherein inter-stage promotion may be implemented if needed for trie balancing. The pipeline 25 may then reach the prefix node stage 284, wherein a plurality of network address prefixes are stored in a data structure that represents a logical node. Each prefix node in the prefix node stage 284 may comprise a pointer to an RE array in the RE stage 286, which may be the final stage in pipeline 25.

According to example embodiments disclosed herein, one or more TCAMs may be utilized to store subtrie roots and achieve balanced trie stages. However, in practice, TCAMs may be relatively expensive in terms of area and power. Another approach disclosed herein for trie stage balancing comprises adding a trie promotion stage implemented through non-TCAM memories. For example, on-chip memory blocks, such as SRAM or eDRAM may be used to store information without needing any need for TCAM.

Figure 3:
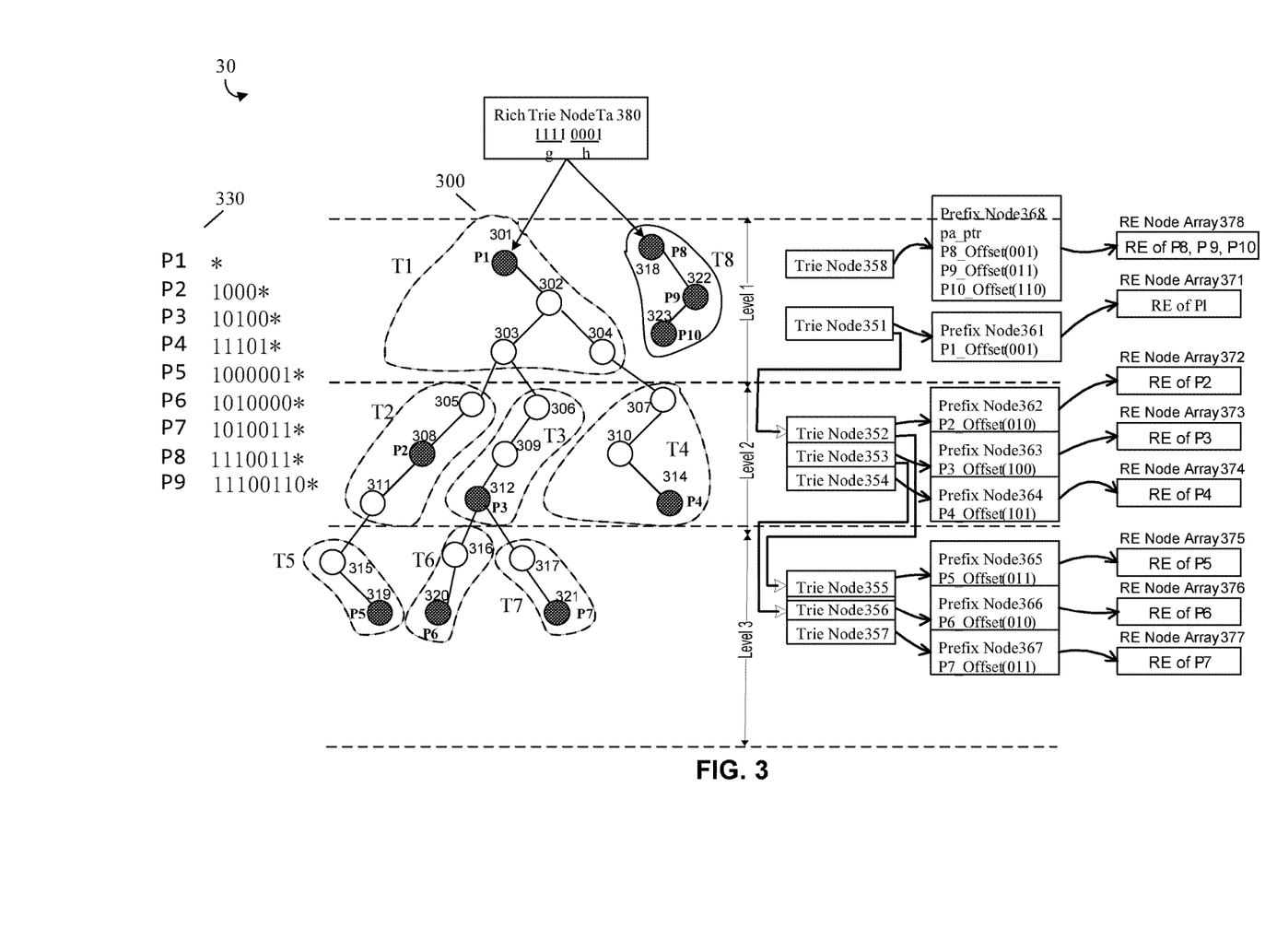
FIG. 3 illustrates an example embodiment of a rich trie balanced lookup algorithm.

FIG. 3 illustrates an example embodiment of a rich trie balanced lookup implementation 30. The implementation 30 uses a trie 300 comprising a plurality of nodes 301-323, wherein corresponding prefixes are shown in a prefix table 330. Trie nodes 351-358 represent subtries T1-T8, respectively, and point to prefix nodes 361-368, respectively. Prefix nodes 361-368 also represent subtries T1-T8, respectively, and point to RE arrays 371-378, respectively. The disclosed lookup implementation 30 may employ a trie promotion stage which may store promoted subtrie roots in a rich trie node 380. A rich trie node may be a data structure that represents one or more subtries and its selected child subtries using one or more subtrie roots. Herein, rich trie node 380 may be configured to store subtrie root T8 in SRAM or eDRAM, similar to the use of TCAM 280 in implementation 20.

Similar to the TCAM 280 in FIG. 2, the rich trie node 380 may be configured to store a plurality of roots that identify subtries. Specifically, the rich trie node 380 may store the root "111001" for subtrie T8 with a 3-bit stride size and may comprise two 4-bit (4'b) fields: 4'b1111 denoted as "g" and 4'b0001 denoted as "h". Each MSB in the 4-bit fields "g" and "h" may be bit markers that indicate whether or not a subtrie root has an additional field to check. For example, the MSB of field "g" is 1, which indicates that there are more fields (i.e., field "h") to check for the subtrie root. In field "h", the MSB is 0, which indicates that "h" is the last field for the subtrie root. The remaining three bits in field "h" and field "g" may be "111" and "001", respectively, which identify the three MSBs and three least significant bits (LSBs), respectively, of the subtrie root. Generally, a promoted subtrie root may be encoded with one or more fields, wherein the last field has an MSB of 0, and other fields each have an MSB of 1. For each field, the remaining bits after the MSB represent a portion of the subtrie root.

In a lookup process, the implementation 30 may initially check for a match with the two fields, "g" and "h", in rich trie node 380 stored in the promotion stage. If a network address does not match the subtrie root "111001", then trie node 351 is accessed, and the implementation 30 may traverse through the remaining nodes in the trie 300 as before. If a network address matches the subtrie root "111001", trie node 358 corresponding to subtrie T8 may be accessed. Trie node 358 may point to prefix node 368, and RE array 378 may be accessed to retrieve forwarding information for the match. Prefix node 368 may also comprise a parent pointer "pa_ptr", which may point to RE array 374 corresponding to P4, the parent prefix for subtrie T8.

Figure 4:
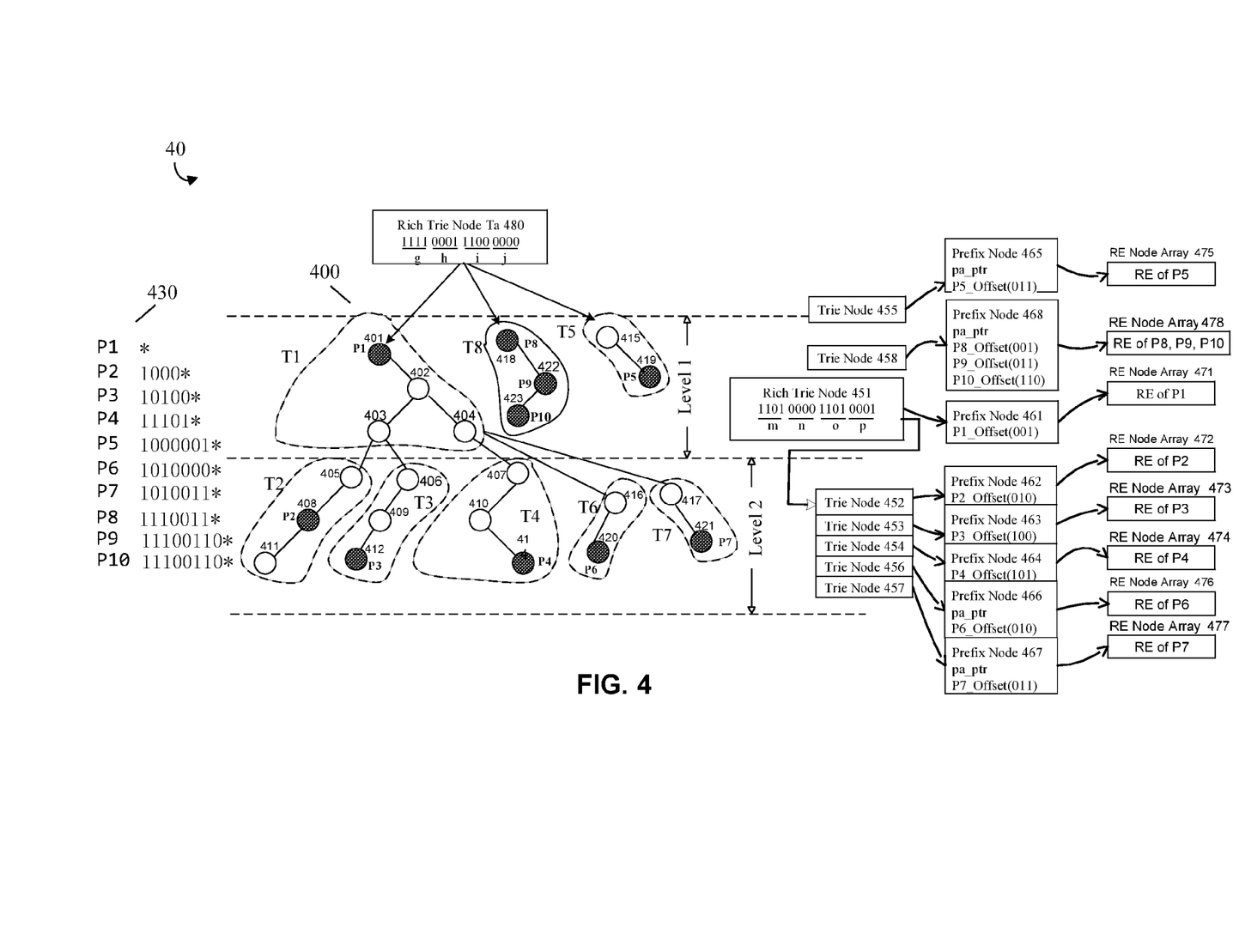
FIG. 4 illustrates an example embodiment of an inter-stage promotion balanced trie-based lookup algorithm.

A trie with less memory stages may be beneficial in producing a balanced prefix distribution among the memory stages. Thus, in other example embodiments, rich trie nodes may also be used in trie levels other than the first subtrie level in order to promote child subtries. FIG. 4 illustrates an example embodiment of an inter-stage promotion balanced trie-based lookup implementation 40. The implementation 40 uses a trie 400 comprising a plurality of nodes 401-423, wherein corresponding prefixes are shown in a prefix table 430. Trie nodes 452-458 represent subtries T2-T8, respectively, and point to prefix nodes 462-468. Prefix nodes 462-468 also represent subtries T2-T8, respectively, and point to RE arrays 472-478, respectively.

The implementation 40 may store a plurality of subtrie roots, such as the ones identifying T8 and T5, in a first rich trie node 480, by using a trie promotion stage as previously described in FIG. 3. Specifically, the T8 root "111001" may be stored in fields "g" and "h", whereas the T5 root "100000" may be stored in fields "i" and "j". Each of the fields may have an aforementioned bit marker and three bits from the corresponding subtrie root.

Further, in order to perform inter-stage promotion, the implementation 40 may utilize a second rich trie node 451, wherein subtries T6 and T7 are shifted from a third level to a second level in trie 400. Rich trie node 451 may point to prefix node 461, which may point to RE array 471. Herein, rich trie node 451 may be configured to store the roots "101000" and "101001" for subtries T6 and T7, respectively, with a 3-bit stride size in four 4-bit fields. The T6 root may be stored in fields "m" and "n", whereas the T7 root may be stored in fields "o" and "p". Each field may comprise a bit marker as the MSB, followed by three bits from the associated subtrie root as previously described.

A parent pointer "pa_ptr" may be added to prefix nodes 465-468 for subtries T5-T8, respectively. Each of the parent pointers may be directed towards a RE array corresponding to the parent prefix for a particular subtrie. For example, the parent prefix for subtrie T5 is P2, the parent prefix for subtries T6 and T7 is P3, and the parent prefix for subtrie T8 is P4. Thus, the "pa_ptr" for subtries T5-T8 points to RE arrays 475-478, respectively. These arrays may be accessed if a prefix mismatch is found during a lookup process.

As a result of the subtrie promotions in FIG. 4, a balanced two-level trie may be achieved, wherein the third level may be eliminated from the trie 400. As mentioned previously, the trie 400 with less memory stages may produce a more balanced prefix distribution among the memory stages. For example, the trie 100 shown in FIG. 1 comprises trie levels which are congested with uneven numbers of subtries and prefixes. Specifically, the first level of trie 100 comprises one subtrie, whereas the third level comprises four subtries. A corresponding memory stage for the first level of trie 100 may be underutilized while a memory stage for the third level may be over utilized or overwhelmed. In comparison, by promoting subtries to earlier levels, the trie 400 comprises a first level with five prefixes and a second level also with five prefixes. Thus, the trie 400 is more balanced and efficient for a network address lookup in IPv4 or IPv6. Furthermore, by utilizing rich trie nodes with non-TCAM memories in the promotion stage and intermediate trie stages, rich trie balancing may avoid the disadvantages associated with utilizing TCAMs.

Figure 5:
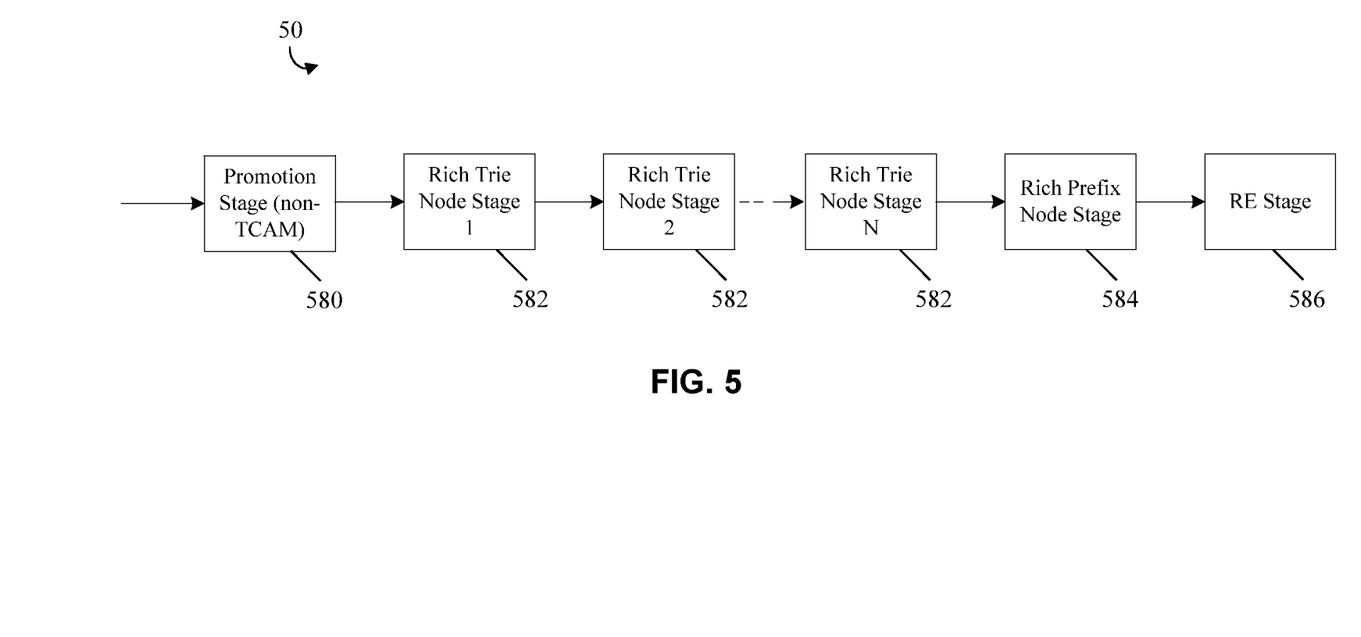
FIG. 5 illustrates another example embodiment of a search pipeline in a balanced trie.

FIG. 5 illustrates another example embodiment of a search pipeline 50 in a balanced trie. As one of ordinary skill will recognize the similarities between the pipeline 50 and the aforementioned pipeline 25, in the interest of conciseness, further description focuses on aspects that are different or not yet covered. The search pipeline 50 may use a series of memory stages that are accessed during a trie-based IP lookup. These memory stages may comprise a promotion stage 580, a plurality of rich trie node stages 582 (numbered from 1 to N which is an integer), a rich prefix node stage 584, and an RE stage 586. In other words, a first memory stage may be used to implement the promotion stage 580, a second memory stage may be used to implement the rich trie node stage 1, a third memory stage may be used to implement the rich trie node stage 2, and so forth. It should be noted that the rich trie node stages may be implemented using multiple memory stages or using one memory stage. Further, each additional memory stage may be used to implement the prefix node stage 584 and the RE stage 586, respectively. Corresponding to the implementation 30 or 40, the plurality of memory stages may be implemented using non-TCAM memories or memory blocks, such as SRAM and/or eDRAM.

In the pipeline 50, root entries identifying subtries T1 and T8 in FIG. 3, may be stored in the promotion stage 580. For example, the promotion stage 580 may be addressed by the 10 MSBs of a LPM search key and may comprise rich trie nodes for trie promotion. Next, the rich trie node stages 582 may follow, wherein inter-stage promotion may be implemented if needed for trie balancing. The pipeline 50 may then reach the rich prefix node stage 584, wherein a plurality of network address prefixes are stored in a data structure that represents a logical node. Each prefix node in the rich prefix node stage 584 may comprise a pointer to an RE array in the RE stage 586, which may be the final stage in pipeline 50.

Figure 6:
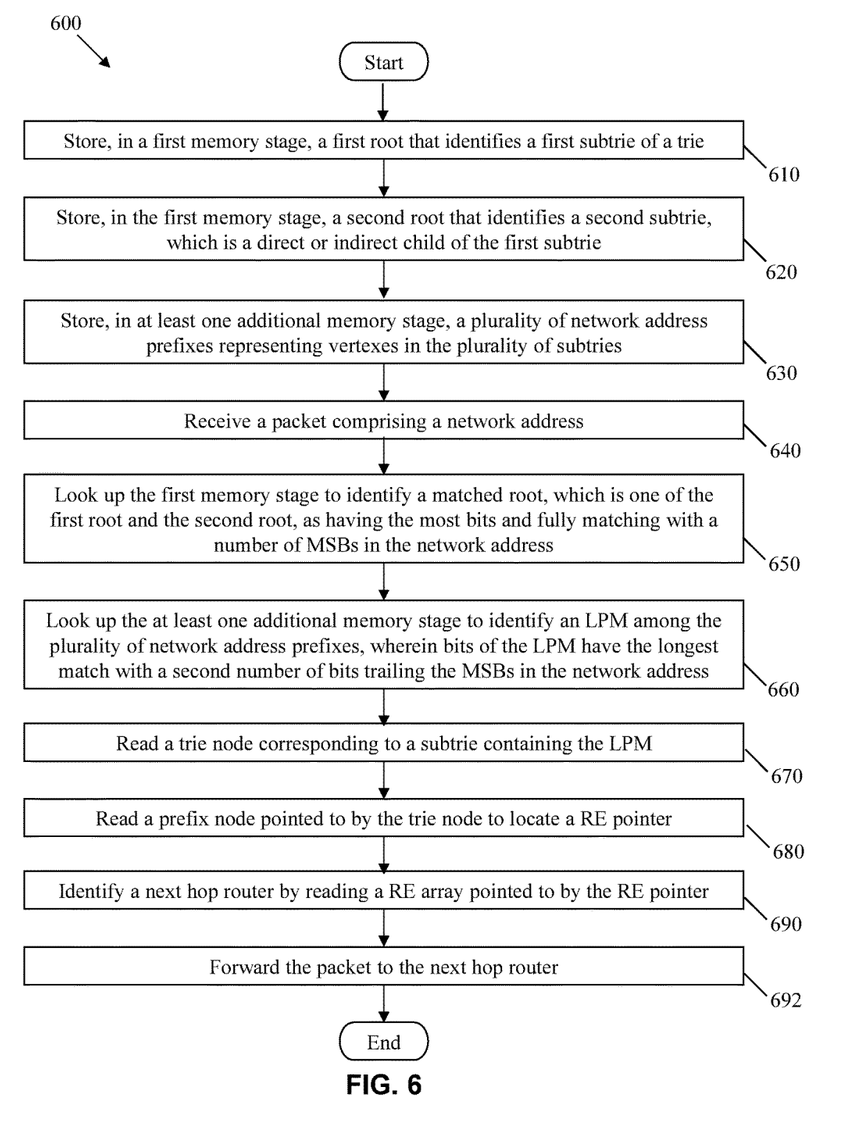
FIG. 6 illustrates an example embodiment of a method.

FIG. 6 illustrates an example embodiment of a method 600 for storing a balanced trie and looking up incoming network addresses using the balanced trie. The method 600 may be implemented by a network unit such as a router which comprises a plurality of memory stages including a first memory stage and at least one additional memory stage coupled to the first memory stage. Note that a rich trie node stage may comprise one or more of the memory stages. The method 600 starts in step 610, in which a first root that identifies a first subtrie of a trie may be stored in the first memory stage. Note that the trie may comprise a plurality of subtries including the first subtrie and a second subtrie that is a direct or indirect child of the first subtrie.

In step 620, the method 600 may store, in the first memory stage, a second root that identifies the second subtrie. Note that any plurality of roots can be stored in the first memory stage, and each root may identify an associated subtrie that is either an immediate or an indirect child subtrie. The second root may refer to any of the roots except the first root and may indicate a traversal path from the first root to a top vertex of the second subtrie. As described above, the first memory stage may be implementing using any suitable storage media such as a TCAM or a non-TCAM stage or block. In the case of non-TCAM, the first memory stage may be a rich trie node stage, and the first and both the first root and the second root may be stored as entries of a rich trie node in the rich trie node stage. Further, an entry storing a root such as the second root may comprise a number of fields, wherein the last field of the entry may comprise one MSB that indicates no additional field following the last field, and all other fields of the entry except the last field may comprise one MSB that indicates one or more additional fields. Bits that follow the MSB in each field may comprise bits of the root. The first memory stage may hold more roots if needed (e.g., in FIG. 4 the first memory stage represented by rich trie node 480 holds roots identifying subtries T1, T5, and T8).

In step 630, the method 600 may store, in the at least one additional memory stage, a plurality of path keys representing vertexes in the plurality of subtries. The plurality of subtries may be in different subtrie levels due to promotion, each of which corresponds to one of the at least one additional memory stage. For example, a first subtrie level (Level 1) may correspond to a second memory stage (as the first memory stage may correspond to the first and second roots but not any subtrie level), and a second subtrie level (Level 2) may correspond to a third memory stage. Further, the plurality of network address prefixes may be stored in a plurality of prefix nodes, each of which containing one or more network address prefixes. Specifically, network address prefixes representing vertexes in the first subtrie and the second subtrie may be stored in the second memory stage. Each additional memory stage may be a rich trie node stage, and more details on the format for storing prefixes in a rich prefix node can be found in U.S. patent application Ser. No. 13/464,840.

In step 640, the method 600 may receive a packet comprising a network address. The packet may be implemented using any suitable form of data communication. In step 650, the method 600 may look up the first memory stage to identify a matched root, which is one of the first root and the second root, as having the most bits and fully matching with a number (this number depends on the length of the second root) of MSBs in the network address. For example, if bits of the second root, which has the most bits, identifying the second subtrie fully match with the MSBs, the second root may be identified as the matched root; otherwise, the first root may be identified as the matched root.

In step 660, the method 600 may look up the at least one additional memory stage to identify a longest prefix match (LPM) among the plurality of network address prefixes, wherein bits of the LPM have the longest match with a second number of bits in the network address. Note that the second number of bits immediately trails the MSBs, and the LPM is a direct or indirect child of the matched root. Because of the two roots stored in the first memory stage, identifying the LPM may need to look up one of the first subtrie and the second subtrie, but may not need to traverse both the first subtrie and the second subtrie for the same lookup. More specifically, if the matched root was the first root, the LPM may be looked up in the first subtrie, or any subtrie that is a direct or indirect child of the first subtrie. If the matched root was the second root, the LPM may be looked up on the second subtrie alone. The ability to locate the second subtrie herein, despite that the second subtrie should have been located on a later level, may help reduce memory access latency.

In an examplary embodiment, inter-stage promotion may be realized by modifying the steps above. For example, the at least one additional memory stage may further comprise a third memory stage, and the plurality of subtries may further comprise a third subtrie that is a direct or indirect child of the first subtrie (note that the third subtrie may be on a second or later subtrie level). For example, in FIG. 4 subtrie T6 or T7 may be the third subtrie, which is a direct child of the first subtrie T1. In this case, network address prefixes representing the third subtrie may be stored in a rich trie node in the third memory stage, so that looking up a network address prefix in the third subtrie T6 or T7 may not need to go through other subtries such as T3.

In step 670, the method 600 may read a trie node corresponding to a subtrie containing the LPM. In step 680, the method 600 may read a prefix node pointed to by the trie node to locate a RE pointer. In step 690, the method 600 may identify a next hop router by reading a RE array pointed to by the RE pointer. Finally, in step 692, the method 600 may forward the packet to the next hop router. One of ordinary skill in the art will recognize that steps illustrated in the method 600 may be modified flexibly depending on the application, and that other steps may be incorporated therein if needed.

Figure 7:
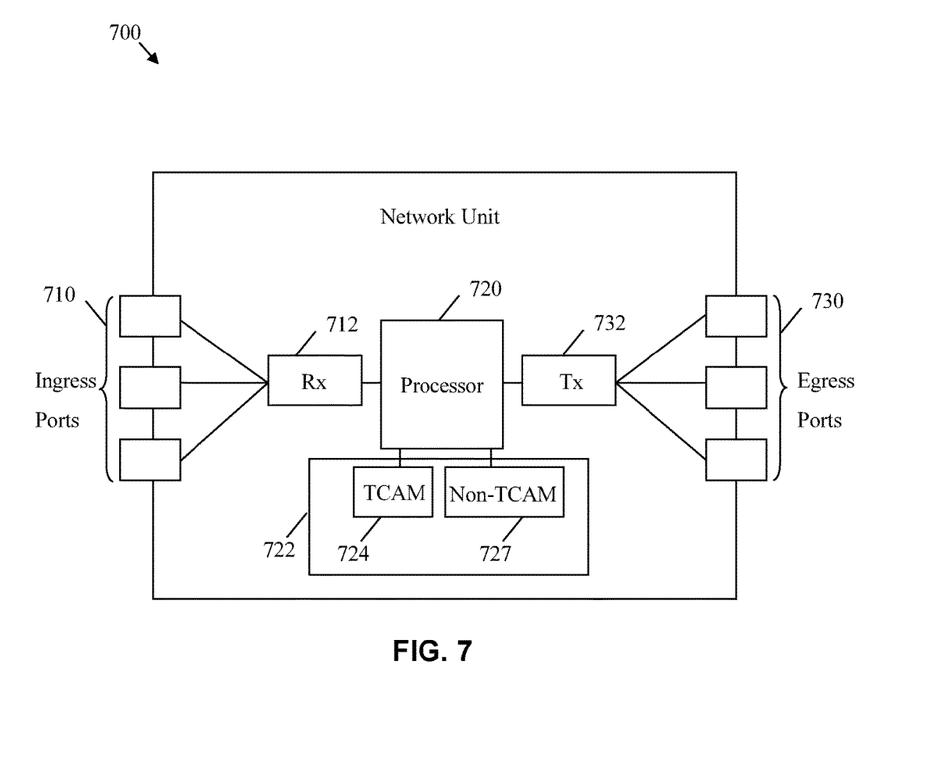
FIG. 7 illustrates an example embodiment of a network device or unit.

FIG. 7 illustrates an example embodiment of a network device or unit 700, which may be any device (e.g., a network router) configured to transport packets through a network. The network device 700 may comprise one or more ingress ports 710 coupled to a receiver 712 (Rx), which may be configured for receiving packets from other network components. The network device 700 may comprise a logic unit or processor 720 coupled to the receiver 712 and configured to process the packets or otherwise determine to which network components to send the packets. The processor 720 may be implemented using hardware or a combination of hardware and software. The processor 720 may be implemented as one or more central processor unit (CPU) chips, cores (e.g., a multi-core processor), field-programmable gate arrays (FPGAs), application specific integrated circuits (ASICs), and/or digital signal processors (DSPs).

The network device 700 may further comprise at least one memory 722. The memory 722 may comprise just non-TCAM memory stages, or a combination of TCAM and non-TCAM memory stages, or any other type of storage. For example, the memory 722 may comprise a TCAM stage 724 and a non-TCAM stage 726. The TCAM stage 724 may be configured to store trie roots and subtrie roots for independent tries. The non-TCAM stage 726 may include one or more SRAM or eDRAM blocks and may be configured to store rich trie nodes, prefix nodes, and RE node arrays. Trie promotion stages and one or more rich tries may also be stored in memory 722. Note that, in practice, there may be bidirectional traffic processed by the network unit 700, thus some ports may both receive and transmit packets. In this sense, the ingress ports 710 and the egress ports 730 may be co-located or may be considered different functionalities of the same ports that are coupled to transceivers (Rx/Tx). The processor 720, the memory 722, the receiver 712, and the transmitter 732 (in some cases with modifications such as replacing the TCAM 724 with another non-TCAM) may also be configured to implement or support any of the trie-based implementations described above, such as the implementation 20, the implementation 30, and the implementation 40, and the method 600.

It is understood that, by programming and/or loading executable instructions onto the network unit 700, at least one of the processor 720 and the memory 722 can be changed. As a result, the network unit 700 may be transformed in part into a particular machine or apparatus (e.g. a network router having the functionality taught by the present disclosure). The executable instructions may be stored on the memory 722 and loaded into the processor 720 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

I claim:

1. In a network router comprising a plurality of memory stages including a first memory stage and at least one additional memory stage coupled to the first memory stage, a method for trie-based network address lookup, the method comprising:

storing, in the first memory stage, a first root that identifies a first subtrie of a trie, wherein the trie comprises a plurality of subtries including the first subtrie and a second subtrie that is a direct or indirect child of the first subtrie;

storing, in the first memory stage, a second root that identifies the second subtrie;

storing, in the at least one additional memory stage, a plurality of network address prefixes representing vertexes in the plurality of subtries;

receiving a packet comprising a network address;

looking up the first memory stage to identify a matched root, which is one of the first root and the second root, as having the most bits and fully matching with a number of most significant bits (MSBs) in the network address; and looking up the at least one additional memory stage to identify a longest prefix match (LPM) among the plurality of network address prefixes, wherein bits of the LPM have the longest match with a second number of bits in the network address, wherein the second number of bits immediately trails the MSBs, wherein the LPM is a direct or indirect child of the matched root, wherein identifying the LPM comprises looking up one, but not both, of the first subtrie and the second subtrie, wherein the plurality of subtries are divided into a number of subtrie levels, each of which corresponds to one of the at least one additional memory stage, wherein the at least one additional memory stage comprises one or more rich trie node stages each comprising one or more rich trie nodes, wherein each rich trie node stores one or more traversal paths, wherein each of the one or more traversal paths represents a path key from a top vertex of a subtrie to a top vertex of a direct or indirect child subtrie, and wherein the second subtrie has been promoted from a later subtrie level to a first subtrie level.

2. The method of claim 1, wherein the at least one additional memory stage comprises a second memory stage corresponding to a first subtrie level and a third memory stage corresponding to a second subtrie level, wherein network address prefixes representing vertexes in the first subtrie and the second subtrie are stored in the second memory stage, wherein the plurality of subtries further comprises a third subtrie that is an indirect child of the first subtrie, wherein a traversal path from the first subtrie to a top vertex of the third subtrie is stored in the second memory stage to indicate a promotion of the third subtrie from a later subtrie level to the second subtrie level, and wherein network address prefixes representing the third subtrie are stored in the third memory stage to support the promotion.

3. The method of claim 2, wherein the first and second memory stages are included in first and second rich trie node stages, wherein both the first root and the second root are stored as entries of a first rich trie node in the first rich trie node stage, and wherein the first subtrie is represented by network address prefixes stored in a second rich trie node in the second rich trie node stage.

4. The method of claim 1, wherein the first memory stage is a ternary content-addressable memory (TCAM), and each of the at least one additional memory stage is a non-TCAM stage.

5. The method of claim 1, wherein both the first root and the second root are stored in entries of a rich trie node in the first memory stage, and wherein the first memory stage and the at least one additional memory stage are implemented using a static random access memory (SRAM) block, or an enhanced dynamic random access memory (eDRAM) block, or both.

6. The method of claim 5, wherein an entry storing the second root comprises a number of fields, wherein a last field of the entry comprises one MSB that indicates no additional field following the last field, and all other fields of the entry except the last field comprises one MSB that indicates one or more additional fields, and wherein bits that follows the MSB in each field comprises bits of the second root.

7. The method of claim 1, wherein the plurality of network address prefixes are stored in a plurality of rich prefix nodes, each of which containing one or more network address prefixes, the method further comprising:
  reading a rich trie node corresponding to a subtrie containing the LPM;
  reading a rich prefix node pointed to by the rich trie node to locate a routing element (RE) pointer;
  identifying a next hop router by reading a RE array pointed to by the RE pointer; and
  forwarding the packet to the next hop router.

8. The method of claim 7, wherein the second root is identified as the matched root, wherein the LPM resides in the second subtrie, and wherein the rich prefix node corresponds to the second subtrie and comprises a parent pointer that points to a parent node of the second subtrie.

9. The method of claim 1, wherein the stored network address prefixes and the network address comprise at least one of Internet Protocol (IP) addresses and Media Access Layer (MAC) addresses.

10. An apparatus comprising:
  a first memory stage configured to:
    store a first root that identifies a first subtrie of a trie, wherein the trie comprises a plurality of subtries including the first subtrie and a second subtrie that is a direct or indirect child of the first subtrie; and
    store a second root that identifies the second subtrie;
  at least one additional memory stage coupled to the first memory stage and configured to store a plurality of network address prefixes representing vertexes in the plurality of subtries;
  a receiver configured to receive a packet comprising a network address; and
  a processor coupled to the receiver, the first memory stage, and the at least one additional memory stage, the processor configured to determine one of the plurality of network address prefixes as having a longest prefix match (LPM) with the network address, wherein determining the LPM comprises:
    looking up the first memory stage to identify' a matched root, which is one of the first root and the second root, as having the most bits and fully matching with a number of most significant bits (MSBs) in the network address; and
    looking up the at least one additional memory stage to identify the LPM as having a longest match with a second number of bits in the network address, wherein the second number of bits immediately trails the MSBs, and wherein the LPM is a direct or indirect child of the matched root, wherein identifying the LPM comprises looking up one, but not both, of the first subtrie and the second subtrie,
  wherein both the first root and the second root are stored as entries of a first rich trie node in the first memory stage,
  wherein the at least one additional memory stage comprises a second memory stage corresponding to a first subtrie level and a third memory stage corresponding to a second subtrie level,
  wherein network address prefixes representing vertexes in the first subtrie and the second subtrie are stored in the second memory stage,
  wherein the plurality of subtries further comprises a third subtrie that is an indirect child of the first subtrie,
  wherein a traversal path from he first subtrie to a top vertex of the third subtrie is stored in the second memory stage to indicate a promotion of the third subtrie from a later subtrie level to the second subtrie level, and
  wherein network address prefixes representing he third subtrie are stored in a second rich trie node in the third memory stage.

11. The apparatus of claim 10, wherein the first memory stage is a ternary content-addressable memory (TCAM), and each of the at least one additional memory stage is a non-TCAM stage.

12. The apparatus of claim 10, wherein both the first root and the second root are stored in entries of a rich trie node in the first memory stage, wherein storing the second root in the rich trie node indicates a promotion of the second subtrie from a later subtrie level to a first subtrie level, wherein an entry storing the second root comprises a number of fields, wherein the last field of the entry comprises one MSB that indicates no additional field following the last field, and all other fields of the entry except the last field comprises one MSB that indicates one or more additional fields, and wherein bits that follows the MSB in each field of the entry comprises bits of the second root.

13. The apparatus of claim 12, wherein the first memory stage and the at least one additional memory stage are implemented using enhanced dynamic random access memory (eDRAM).

14. The apparatus of claim 12, wherein the first memory stage and the at least one additional memory stage are implemented using static random access memory (SRAM).

15. A computer program product comprising computer executable instructions stored on a non-transitory computer readable medium such that when executed by a processor cause a network unit to:
  store, in a ternary content-addressable memory (TCAM), a first root that identifies a first subtrie of a trie, wherein the trie comprises a plurality of subtries including the first subtrie and a second subtrie that is a direct or indirect child of the first subtrie;

store, in the TCAM, a second root that identifies the second subtrie;

store, in a non-TCAM memory, a plurality of network address prefixes representing vertexes in the plurality of subtries;

receive a packet comprising a network address;

look up the TCAM to identify a matched root, which is one of a plurality of subtrie roots stored in the TCAM for a trie, as having all bits matching with a number of most significant bits (MSBs) in the network address, wherein the matched root is a direct or indirect child of a root of the trie; and look up non-TCAM memory to identify a longest prefix match (LPM) as having a longest match with a second number of bits trailing the MSBs in the network address, wherein the LPM is one of a plurality of network address prefixes residing in a subtrie comprising the matched root, and wherein the LPM is a direct or indirect child of a top vertex identified by the matched root, wherein the plurality of subtries are divided into a number of subtrie levels, each of which corresponds to the non-TCAM memory, wherein the non-TCAM memory comprises one or more rich trie node stages each comprising one or more rich trie nodes, wherein each rich trie node stores one or more traversal path, wherein each of the one or more traversal paths represents a path key from a top vertex of a subtrie to a top vertex of a direct or indirect child subtrie, and wherein the second subtrie has been promoted from a later subtrie level to a firs subtrie level.

16. The computer program product of claim 15, further comprising instructions that cause the network unit to:

read a rich trie node corresponding to the subtrie;

read a rich prefix node pointed to by the rich trie node to locate a routing element (RE) pointer, wherein the rich prefix node corresponding to the subtrie comprises a parent pointer that points to a parent node of the subtrie;

identify a next hop router by reading a RE array pointed to by the RE pointer; and forward the packet to the next hop router.

\* \* \* \* \*

UNITED STATES PATENT AND TRADEMARK OFFICE
CERTIFICATE OF CORRECTION

PATENT NO. : 9,602,407 B2
APPLICATION NO. : 14/108581
DATED : March 21, 2017
INVENTOR(S) : Zixiong Wang It is certified that error appears in the above-identified patent and that said Letters Patent is hereby corrected as shown below:

In the Claims

Column 15, Lines 52-67, through Column 16, Lines 1-37, Claim 10 should read:
10. An apparatus comprising:
    a first memory stage configured to:
        store a first root that identifies a first subtrie of a trie, wherein the trie comprises a plurality of subtries including the first subtrie and a second subtrie that is a direct or indirect child of the first subtrie; and
        store a second root that identifies the second subtrie;
    at least one additional memory stage coupled to the first memory stage and configured to store a plurality of network address prefixes representing vertexes in the plurality of subtries;
    a receiver configured to receive a packet comprising a network address; and
    a processor coupled to the receiver, the first memory stage, and the at least one additional memory stage, the processor configured to determine one of the plurality of network address prefixes as having a longest prefix match (LPM) with the network address, wherein determining the LPM comprises:
        looking up the first memory stage to identify a matched root, which is one of the first root and the second root, as having the most bits and fully matching with a number of most significant bits (MSBs) in the network address; and
        looking up the at least one additional memory stage to identify the LPM as having a longest match with a second number of bits in the network address, wherein the second number of bits immediately trails the MSBs, and wherein the LPM is a direct or indirect child of the matched root, wherein identifying the LPM comprises looking up one, but not both, of the first subtrie and the second subtrie,
        wherein both the first root and the second root are stored as entries of a first rich trie node in the first memory stage,
        wherein the at least one additional memory stage comprises a second memory stage corresponding to a first subtrie level and a third memory stage corresponding to a second subtrie level, Signed and Sealed this
Twenty-seventh Day of June, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,602,407 B2 wherein network address prefixes representing vertexes in the first subtrie and the second subtrie are stored in the second memory stage, wherein the plurality of subtries further comprises a third subtrie that is an indirect child of the first subtrie, wherein a traversal path from the first subtrie to a top vertex of the third subtrie is stored in the second memory stage to indicate a promotion of the third subtrie from a later subtrie level to the second subtrie level, and wherein network address prefixes representing the third subtrie are stored in a second rich trie node in the third memory stage.

Column 16, Lines 61-67, through Column 16, Lines 1-12, Claim 15 should read:
15. A computer program product comprising computer executable instructions stored on a non-transitory computer readable medium such that when executed by a processor cause a network unit to:

store, in a ternary content-addressable memory (TCAM), a first root that identifies a first subtrie of a trie, wherein the trie comprises a plurality of subtries including the first subtrie and a second subtrie that is a direct or indirect child of the first subtrie;

store, in the TCAM, a second root that identifies the second subtrie;

store, in a non-TCAM memory, a plurality of network address prefixes representing vertexes in the plurality of subtries;

receive a packet comprising a network address;

look up the TCAM to identify a matched root, which is one of a plurality of subtrie roots stored in the TCAM for a trie, as having all bits matching with a number of most significant bits (MSBs) in the network address, wherein the matched root is a direct or indirect child of a root of the trie; and look up the non-TCAM memory to identify a longest prefix match (LPM) as having a longest match with a second number of bits trailing the MSBs in the network address, wherein the LPM is one of a plurality of network address prefixes residing in a subtrie comprising the matched root, and wherein the LPM is a direct or indirect child of a top vertex identified by the matched root, wherein the plurality of subtries are divided into a number of subtrie levels, each of which corresponds to the non-TCAM memory, wherein the non-TCAM memory comprises one or more rich trie node stages each comprising one or more rich trie nodes, wherein each rich trie node stores one or more traversal paths, wherein each of the one or more traversal paths represents a path key from a top vertex of a subtrie to a top vertex of a direct or indirect child subtrie, and wherein the second subtrie has been promoted from a later subtrie level to a first subtrie level.